US00RE42517E

(19) United States
(12) Reissued Patent
Girault et al.

(10) Patent Number: US RE42,517 E
(45) Date of Reissued Patent: Jul. 5, 2011

(54) AUTHENTICATING OR SIGNATURE METHOD WITH REDUCED COMPUTATIONS

(75) Inventors: Marc Girault, Caen (FR); Jean-Claude Pailles, Epron (FR)

(73) Assignee: Phentam Dire NV, LLC, Dover, DE (US)

(21) Appl. No.: 12/393,959

(22) PCT Filed: Jan. 26, 2000

(86) PCT No.: PCT/FR00/00174

§ 371 (c)(1),
(2), (4) Date: Jul. 27, 2001

(87) PCT Pub. No.: WO00/45549

PCT Pub. Date: Aug. 3, 2000

Related U.S. Patent Documents

Reissue of:
(64) Patent No.: 7,184,547
Issued: Feb. 27, 2007
Appl. No.: 09/889,557
Filed: Jul. 27, 2001

(30) Foreign Application Priority Data

Jan. 27, 1999 (FR) ..... 9900887

(51) Int. Cl.
*H04L 9/28* (2006.01)

(52) U.S. Cl. ..... 380/30; 713/168; 713/171; 380/282

(58) Field of Classification Search ..... 380/28, 380/30; 713/168, 170
See application file for complete search history.

(56) References Cited

U.S. PATENT DOCUMENTS

| | | | | | |
|---|---|---|---|---|---|
| 4,964,164 | A | * | 10/1990 | Fiat | 380/30 |
| 5,140,634 | A | * | 8/1992 | Guillou et al. | 713/180 |
| 5,218,637 | A | | 6/1993 | Angebaud | |
| 5,787,178 | A | * | 7/1998 | Schwenk | 380/30 |

FOREIGN PATENT DOCUMENTS

| | | | | |
|---|---|---|---|---|
| EP | 0325 238 | | * | 7/1989 |
| EP | 0325238 | | * | 7/1989 |
| EP | 0325238 | A2 | | 7/1989 |
| FR | 2 716 058 | | | 8/1995 |
| FR | 2 752 122 | | | 2/1998 |
| FR | 2752122 | A1 | | 2/1998 |
| FR | 2716058 | A1 | | 8/1998 |
| JP | 08149124 | A | | 6/1996 |
| JP | 11008616 | A | | 12/1999 |
| WO | 8911706 | A1 | | 11/1989 |
| WO | WO 89/11706 | | * | 11/1989 |
| WO | 9842173 | A2 | | 10/1998 |
| WO | WO 98/42173 | | | 10/1998 |
| WO | 9851038 | A1 | | 11/1998 |

OTHER PUBLICATIONS

International Search Report mailed Feb. 25, 2000, for PCT App. PCT1FR00/00174.
International Preliminary Examination Report received by WIPO on Dec. 21, 2000, for PCT App. PCT/FR00/00174.
Office Action mailed Jan. 31, 2005, for U.S. Appl. No. 09/889,557.
Final Office Action mailed May 27, 2005, for U.S. Appl. No. 09/889,557.
Office Action mailed Sep. 27, 2005, for U.S. Appl. No. 09/889,557.
Final Office Action mailed Jan. 18, 2006, for U.S. Appl. No. 09/889,557.
Notice of Allowance mailed Nov. 2, 2006, for U.S. Appl. No. 09/889,557.
Schneier, "Mathematical Background: Number Theory", Applied Cryptography— Protocols, Algorithms, and Source Code in C (Second Edition) New York: John Wiley & Sones, 1996 pp. 249-250.
Schneier, "Public Key Algorithms: RSA", Applied Cryptography— Protocols, Algorithms, and Source Code in C (Second Edition) New York: John Wiley & Sones, 1996 pp. 470.
Brandt et al., "Zero-Knowledge Authentication Scheme with Secret Key Exchange", Advances in Cyptology—Crypto '88 Proceedings, pp. 583-588, Aug. 21-25, 1988.
Fiat et al., "How to Prove Yourself: Practical Solutions to Identification and Signature Problems", Advances in Cyptology—Crypto '86 Proceedings, pp. 1806-194, Aug. 11-16, 1986.
Königs, "Cryptographic Identification Methods for Smart Cards in the Process of Standardization", IEEE Communications Magazine, vol. 29, No. 6, pp. 42-48, Jun. 1991.
Guillou et al., "A Practical Zero-Knowledge Protocol Fitted to Security Microprocessor Minimizing Both Transmission and Memory", Advances in Cryptology—Eurocrypt '88 pp. 123-128, May 25-27, 1988.
Quisquater et al., "Fast Decipherment Algorithm for RSE Public-Key Cryptosystem", Electronics Letters, vol. 18, No. 21, pp. 905-907, Oct. 14, 1982.

(Continued)

*Primary Examiner* — Ninh Dinh
*Assistant Examiner* — Venkat Perungavoor
(74) *Attorney, Agent, or Firm* — Schwabe, Williamson & Wyatt

(57) ABSTRACT

Authentication and signature process with reduced number of calculations.
The process involves a first entity called the "prover", which possesses a public key v and a secret key s, these keys verify the relation $v=s^{-t} \pmod{n}$, where n is an integer called modulus and t is a parameter, and a second entity called a "verifier", which knows the public key v. This process implies exchange of information following a "zero-knowledge protocol" between the verifier and the prover and cryptographic calculations on this information, some calculations being carried out "modulo n". The process of the invention is characterised by the fact that the modulus n is specific to the prover that communicates this modulus to the verifier.

12 Claims, No Drawings

OTHER PUBLICATIONS

Preliminary Search Report dated Dec. 28, 1999 for FR App. 9900887.
Notice of Reasons for Rejection for Japanese App. 2000-596695 mailed Apr. 23, 2010.
Office Action for JP App. 2000-596695 dated Feb. 24, 2011, including Concise Explanation of Relevance (4 pgs.).
Scheiner, Bruce, Applied Cryptography—Protocvols, Algorithms, and Source Code in C(Second Edition), John Wiley & Sons, Inc(1996): pp. 249-250.*
Scheiner, Bruce. "Public-Key Algorithms: RSA." Applied Cryptography: Protocols, Algorithms and Source Code in C. New York: John Wiley & Sons, 1996. pp. 470.*
Schenier, Bruce. "Mathematical Background: Number Theory." Applied Cryptography: Protocols, Algorithms and Source Code in C. New York: John Wiley & Sons, 1996. pp. 249-250.*
Schneier, Bruce. Applied Cryptography, "Number Theory". New York, NY, 1996, 244-80.*
J. Brandt, et al., Advances in Cryptology—Crypto '88 Proceedings, pp. 583-588, "Zero-Knowledge Authentication Scheme with Secret Key Exchange", Aug. 21-25, 1988.
A. Fiat, et al., Advances in Cryptology—Crypto '86 Proceedings, pp. 186-194, "How to Prove Yourself: Practical Solutions to Identification and Signature Problems", Aug. 11-15, 1986.
H-P. Konigs, IEEE Communications Magazine, vol. 29, No. 6, pp. 42-48, "Cryptographic Identification Methods for Smart Cards in the Process of Standardization", Jun. 1991.
L. C. Guillou, et al, Advances in Cryptology—Eurocrypt '88, pp. 123-128, "A Practical Zero-Knowledge Protocol Fitted to Security Microprocessor Minimizing Both Transmission and Memory", May 25-27, 1988.
J-J. Quisquater, et al., Electronics Letters, vol. 18, No. 21, pp. 905-907, "Fast Decipherment Algorithm for RSA Public-Key Cryptosystem", Oct. 14, 1982.

* cited by examiner

AUTHENTICATING OR SIGNATURE METHOD WITH REDUCED COMPUTATIONS

Matter enclosed in heavy brackets [ ] appears in the original patent but forms no part of this reissue specification; matter printed in italics indicates the additions made by reissue.

TECHNICAL DOMAIN

The present invention relates to an authentication or signature process with a reduced calculations set.

More precisely, the invention relates to the public key cryptography domain. Following this process, the entity to be authenticated—the prover—possesses a secret key and an associated public key. The authenticating entity—the verifier—only needs this public key to achieve the authentication.

Even more precisely, the process relates to the set of processes called "zero-knowledge Protocols", i.e. without any communication of knowledge. According to this kind of process, the authentication is carried out following a protocol that, as it is recognized, and under assumptions considers as perfectly reasonable by the scientific community, discloses nothing about the secret key of the prover.

To be even more precise, the invention relates to zero-knowledge processes based on factoring problems (i.e. on the difficulty to factor large integers into a product of prime numbers).

The invention is applicable in every system where it is necessary to authenticate parties or messages, or to sign messages, in particular in systems where the amount of calculations to be carried out by the prover is critical. This is especially the case for cards that use a standard microprocessor or low cost cards, with no arithmetic coprocessor (which are often called cryptoprocessor) where cryptographic calculations must be accelerated.

A typical application of the invention is the electronic purse that requires a very high security level while discarding the use of a cryptoprocessor, either because of the cost or for technical reasons (for example the use of a contactless interface), or both.

Another possible application is the next generation telecard, whose cost constraints are by far stricter than those of the electronic purse.

PRIOR ART

A number of zero-knowledge identification processes have been published. For example:

The FIAT-SHAMIR protocol described in the article by A. FIAT and A. SHAMIR entitled "how to prove yourself: Practical solutions to identification and signature problems", published in "Advances in Cryptology: Proceedings of CRYPTO'86, Lecture Notes in Computer Science", vol. 263, Springer-Verlag, Berlin, 1987, pp. 186-194, The GUILLOU-QUISQUATER protocol, described in the article by L. C. GUILLOU and J. J. QUISQUATER, entitled "A practical zero-knowledge protocol fitted to security microprocessors minimizing both transmission and memory," published in "Advances in Cryptology: Proceedings of EUROCRYPT '88; Lecture notes in Computer Sciences, vol. 330, Springer-Verlag, Berlin, 1988, pp. 123-128, The GIRAULT protocol described in the French patent application FR-A-2 176 058, based on the discrete logarithm problem.

Generally speaking, most zero-knowledge identification (or message authentication) protocols involve three steps. For the sake of simplicity, we shall assume that the verifier B already knows all the public parameters related to the prover A, i.e. its identity, its public key and so on.

As a first transaction, A supplies B with a value "c" called "opening", image through a pseudo-random function h of a parameter x (itself derived from a number r selected by A at random), as well as with the message to be authenticated or signed: $c=h(x,[M])$, where the symbol [M] means that M is optional. This is the first step. Some protocols may involve several openings.

During a second transaction, B sends to A a parameter e selected at random (the "question"). It is the second step.

During a third transaction, A sends to B an "answer" y that is in coherence with the question e, the opening c and the secret key of A (third step).

Then B checks the received answer. More precisely, B recalculates x from the elements y, e and v using the relation $x=\phi(y,e,v)$ and verifies that $c=h(\phi(v,e,y),[M])$, which is the fourth step.

When there is no message to authenticate, the use of the pseudo-random function h is optional. In this case, $c=x$ is convenient. The verification consists of checking that $x=\phi(y,e,v)$.

In some protocols, there are one or two more transaction(s) between the verifier and the prover.

For a message signature, the two first steps are discarded, as the parameter e is made equal to c; A then successively and only calculates c, e(=c) and y.

The number u of questions to be answered depends directly on the desired protocol security level. This level is defined as the probability p of detecting an impostor. (i.e. an entity C that fraudulently mimics A). It is measured by a parameter k whose value is related to p by the relation $p=1-2^{-k}$. In other words, the impostor only has 1 chance in $2^k$ of succeeding. It can be demonstrated in the present case that if a protocol relies on a difficult mathematical calculation, and if the openings are of adequate length, the length of u must simply equal k bits. A typical value of k is 32, which gives the impostor one chance in 4 billion to be successful. In applications where the failure of an identification may have very harmful consequences (e.g. legal proceedings), this length may be reduced to a few bits.

For protocols using factoring, the calculation of x in terms of r, or the calculation of y in terms of e, or both, involve(s) operations modulo n, where n is a compound number that is hard to factor. This number is said to be of the universal type, generated by a trustworthy third party. It is stored and used by all authorised entities. The "universal" character of n implies that it is a large number (usually 1024 bits), as breaking the factoring of n should compromise the secret keys of all accredited users.

In their basic versions, none of the above mentioned protocols can be implemented in an application that has to comply with severe specifications (low cost, low sophistication), as described in the previous section, as the required calculations could not be performed by a microprocessor card without a cryptoprocessor.

Though the French patent application FR-A-2 752 122 describes an optimization of these protocols, it is restricted to protocols involving the discrete logarithm method following a mode called "with pre-calculations" that has the drawback of implying regularly scheduled reloads.

The document from J. BRANDT et al. entitled "zero-knowledge Authentication scheme with Secret Key Exchange" published in Advances in Cryptology, Crypto 88 Proceedings, XP 000090662, pp. 583-588, describes a zero-knowledge authentication scheme with exchange of secret keys between two users, a scheme wherein the prover calculates its own modulus n=pq and carries out an operation of the type $m^d$ (mod n).

The present invention aims to reduce the number of calculations to be carried out by the prover when using zero-knowledge identification (or message signature or authentication) protocols involving factoring, the gain being liable to reach a factor 2 or 3 when using a particular operation $v=s^{-t}$ (mod n).

It also makes possible—and in particular when coupled with the GUILLOU-QUISQUATER protocol—the fast completion of an identification (or message authentication or signature) with public key included in a low cost standard microcircuit card, for applications such as the electronic purse or next generation telecard.

DESCRIPTION OF THE INVENTION

The modulus n being an individual parameter (in other words each user owns his own n value), this selection may be exploited in the following two ways (which may be advantageously combined):

1) first by retaining a length of n lower than the currently used values (typically lower than 1000 bits and for example, ranging between 700 and 800 bits); this is possible as breaking the factoring of n only compromises the secret key of the related user and in no way the secret keys of other users; this modification alone reduces the duration of calculations carried out modulo n by 40%;

2) If the user has stored the prime factors of n in the memory of his security device, he may use the Chinese remainders technique to further reduce the duration of modulo n calculations by 40%, when there are two prime factors; this reduction may be increased when using several prime factors (typically 3 or 4).

On the whole, the modulo n calculations can then be reduced by 60%, that is a factor 2, at least.

Precisely, the invention relates to a process of identification involving a first entity called a "prover", owning a public key v and a secret key s, these keys being related by a modulo n calculation, where n is an integer called modulus, specific to the prover, and a second entity called a "verifier", which knows the public key v, these entities being provided with means to exchange information in a zero-knowledge context and to carry out cryptographic calculations on this information, some calculations being performed in the modulo n mode, the process being characterised by the fact that the modulus of the modulo n operation expressed as $v=s^{-t}$ (mod n), t being a parameter.

The aforementioned entities may be, for example, microcircuit cards, electronic purses, telecards, and so on . . .

Following a preferred implementation, the zero-knowledge information exchanges and the cryptographic calculations are as follows:

the prover selects one (several) integer(s) r at random ranging between 1 and n−1 and calculates one (several) parameter(s) x equal to $r^t$ (mod n), then one (several) number(s) c called opening(s) that is (are) one (several) function(s) of this (these) parameter(s) and possibly of a message (M), and sends this (these) opening(s) to the verifier;

the verifier entity receives the opening(s) c, selects one number e at random called "question" and sends this question to the prover;

the prover receives the question e, carries out one (several) calculation(s) using this question e and the secret key s, the result of this (these) calculation(s) yielding one (several) answer(s) y, and sends this (these) answer(s) to the verifier.

The verifier receives the answer(s) y, carries out one calculation using the public key v and the modulus n, and checks with a modulo n calculation that the result is coherent with the received opening(s).

The size of the number n, expressed in number of bits, is less than 1000. For example, it may be between 700 and 800.

The present invention also relates to a message signature process to be used by an entity called a "signatory", this entity being provided with a public key v and a secret key s, which are related by a modulo n operation, where n is an integer called modulus and t is a parameter, a process in which the signatory calculates an opening c that is notably a function of the message to be signed and a number y that is a function of the secret key, transmits the numbers y and c that are the signature and the message, the process being characterised in that the modulus n is specific to the signatory.

Following a preferred implementation, the signatory selects an integer r at random between 1 and n−1, calculates a parameter x equal to $r^t$ (mod n), calculates a number c that is a function of the parameter x and of the message to be signed, calculates a number y using the secret key s, as a function of numbers r and e, then transmits the numbers c and y as signature.

DETAILED DESCRIPTION OF PARTICULAR IMPLEMENTATIONS FOR THE INVENTION

In the following description, the invention is assumed to be combined with the protocol GUILLOU-QUISQUATER, as an example. It is clear that the invention is not restricted to this protocol.

Note that the universal parameters of the GUILLOU-QUISQUATER protocol are the modulus n, products of prime numbers, comprising at least 1024 bits, and an integer value t.

The public key v and the secret key s verify the relation $v=s^{-t}$ (mod n).

The retained security level is u (lower than or equal to t, commonly equal to t)

The authentication of A by B, which are named Alice and Bob, following the usual terminology, is completed as follows:

1. Alice selects r within the range [1,n−1], calculates $x=r^t$ (mod n) then c=h(x,[M]) and sends c to Bob.
2. Bob selects e within the range [1,u−1] and sends e to Alice.
3. Alice calculates $y=rs^e$ (mod n) and sends y to Bob.
4. Bob calculates $x=y^tv^e$ (mod n) and verifies that c=h(x, [M])

When no message is to be authenticated, it is optional to involve the pseudo random function h: c=x can be used. The verification then consists of checking that $x=y^tv^e$ (mod n).

In the protocol modified in accordance with the invention, t is the only universal parameter.

The public key is (n,v), where n has at least 768 bits. The public key v and the secret key of Alice satisfy the relation $v=s^{-t}$ (mod n).

The secret key may include prime factors from n to take advantage of the second aspect of the invention.

The parameter t may be included in the public key (in this case, there is no longer any universal parameter).

The security level retained by Alice and Bob is u (lower than or equal to t; usually u=t).

The authentication of Alice by Bob is performed as described above, but with faster calculations, which results from a smaller modulus n.

As all Alice's calculations are carried out modulo n, the gain factor resulting from only one modular multiplication affects the complete set of calculations completed by Alice when carrying out the protocol. This should be the same, for example, with Fiat-Shamir or Girault protocols (in the latter case, no gain should be expected in step 3, as there is no modular computation, but the execution time of this step is negligible with respect to the modular exponentiation of the first one).

The invention may also be implemented by the Chinese remainders technique, which consists of calculating the values modulo n of the prime factors of n. As these numbers are inevitably smaller, these operations are quickly done. The result modulo n is still to be obtained through a "reconstitution" operation. This technique is described in the article of J. J QUISQUATER and C. COUVREUR entitled (Fast Decipherment algorithm for RSA public-key crypto-system" published in "Electronic Letters", vol. 18, October 1982, pp. 905-907.

Let's consider the case when n is the product of two prime factors p and q.

From the Bezout theorem, it is known that two integers exists, such as ap+bq=1

To calculate $y=x^e$ (mod n), we start by reducing x modulo each prime factor by calculating $x_p=x$ (mod p) and $x_q=x$ (mod q). We also reduce e modulo (p−1) and (q−1) by calculating $e_p=e$ modulo (p−1) and $e_q=e$ (modulo q−1) (in the protocol of Quillou-Quisquater, e is always lower than e−1 and q−1, then $e_p=e_q=e$.

We then calculate $y_p=x_p^{e_p}$ (mod p) and $y_q=x_q^{e_q}$ (mod q). When p and q are of similar size, each of these calculations is about 8 times faster than the calculation $y=x^e$ (mod n) when e and n are of similar size (first case); 4 times faster when the size of e is lower than or equal to the size of p (second case as, for example, in the algorithm). The set of two calculations is then either 4 times faster or 2 times faster.

y is still to be reconstructed from $y_p$ and $y_q$, which is carried out using the relation:

$$xy=y_p+ap(y_q-y_p)(\text{mod } n)$$

On the whole, the method of Chinese remainders leads to an acceleration of calculations by a factor ranging from 3 to 4 in the first case, and from 1.5 to 2 in the second case, when the number of prime factors (assumed to be of similar sizes) is larger than 2 and equal to k; the acceleration factor is nearing $k^2$ in the first case and close to k in the second case.

The invention claimed is:

1. An authentication process involving a first device, which possesses a public key v and a secret key s, the public and secret keys being related by an operation modulo n, where n is an integer, the modulus n being specific to the first device, and a second device, which knows the public key v, the first and second [entities] *devices* being provided with means to exchange zero-knowledge information and to carry out cryptographic calculations on the zero-knowledge information, calculations being carried out modulo n wherein in the process the modulo n operation is of $v=s^{-t}$ (mod n), t being a parameter and in that the modulo n calculations are performed according to the "Chinese remainders" method and in that the modulus n is the product of two primes of similar size.

2. A process according to claim 1, wherein the information exchanges are of zero-knowledge and wherein the cryptographic calculations are completed as follows:

the first device selects are at least one integer r at random ranging between 1 and n−1 and calculates at least one parameter x equal to $r^t$ (mod n), then at least one number c that is at least one function of the at least one of a parameter and a message and sends the at least one number c to the second device;

the second device receives the at least number c, selects at least one number e at random, and sends the at least one number e to the first device;

the first device receives the at least one number e, carries out at least one calculation using the at least one number e and the secret key s, the result of the at least one calculation yielding at least one answer y, and sends the at least one answer y to the second device;

the second device receives the at least one answer y, carries out one calculation using the public key v and the modulus n, and checks with a modulo n operation that the result of the one calculation is coherent with the received at least one number c.

3. A process according to claim 2, wherein a size of the number n, expressed in number of bits, is less than 1,000.

4. A process according to claim 3, wherein a size of the number n is between 700 and 800.

5. A message signature process configured for a device provided with a public key v and a secret key s, the public and private keys being related by a modulo n calculation, where n is an integer, which is specific to the device, the process utilizing means configured to calculate at least one number c that is a function of a message M to be signed, configured to calculate at least one number y that is a function of the secret key s, and configured to transmit the numbers y and c that are the signature of the message and the message M, wherein the modulo n operation is v=s−t (mod n), t being a parameter wherein the modulo n calculations are performed according to the "Chinese remainders" method and in that the modulus n is the product of two primes of similar size.

6. A message signature process according to claim 5, wherein the device selects an integer r at random between 1 and n−1, calculates a parameter x equal to rt (mod n), calculates at least one number e that is a function of parameter x and the message M to be signed, calculates the at least one number y using its secret key s, said at least one number y being a function of numbers r and e, and transmits the numbers c and y as the signature.

*7. A method of authentication, the method comprising:*

*generating and sending an opening c by a prover device, wherein generating an opening c comprises:*

*calculating modulo n, wherein n is an integer specific to the prover device, and is a product of prime numbers;*

*selecting randomly a number r between 1 and n−1;*

*calculating a parameter x equal to $r^t$ (mod n), where t is a parameter; and*

*calculating the opening c based at least in part on the parameter x;*

*receiving a question e by the prover device, in response to the sending of the opening c;*

*generating and sending a result y by the prover device to enable the prover device to be authenticated based on the result y and a public key v associated with a secret key s possessed by the prover device, wherein generating a result y is based at least in part on the question e and the secret key s, and comprises calculating modulo n;*

*wherein calculating modulo n comprises using a "Chinese remainders" method.*

*8. A prover device for an authentication process, the prover device comprising:*

*a storage device configured to store a secret key s possessed by the prover device; and*

*a processor coupled to the storage device, and configured to generate an opening c, and cause the prover device to send the opening c, wherein generation of an opening c comprises:*

*calculation of modulo n, wherein n is an integer specific to the prover device, and is a product of prime numbers;*

*random selection of a number r between 1 and n−1;*

*calculation of a parameter x equal to* $r^t$ *(mod n), where t is a parameter; and*

*calculation of the opening c based at least in part on the parameter x;*

*control the prover device in receiving a question e, in response to the sending of the opening c;*

*generate and cause the prover device to send a result y to enable the prover device to be authenticated based on the result y and a public key v associated with the secret key s, wherein generation of a result y is based at least in part on the question e and the secret key s, and comprises calculation of modulo n;*

*wherein calculation of modulo n comprises using a "Chinese remainders" method, and at least two prime factors of n.*

*9. An article of manufacture comprising a non-transitory computer readable medium, and instructions stored in the non-transitory computer readable medium, wherein the instructions if executed on a prover device causes the prover device to perform an authentication method, the method comprising:*

*generating and sending an opening c by the prover device, wherein generating an opening c comprises:*

*calculating modulo n, wherein n is an integer specific to the prover device, and is a product of prime numbers;*

*selecting randomly a number r between 1 and n−1;*

*calculating a parameter x equal to* $r^t$ *(mod n), where t is a parameter; and*

*calculating the opening c based at least in part on the parameter x;*

*receiving a question e by the prover device, in response to the sending of the opening c;*

*generating and sending a result y by the prover device to enable the prover device to be authenticated based on the result y and a public key v associated with a secret key s possessed by the prover device, wherein generating a result y is based at least in part on the question e and the secret key s, and comprises calculating modulo n;*

*wherein calculating modulo n comprises using a "Chinese remainders" method, and at least two prime factors of n.*

*10. The method of claim 7, wherein generating a result y comprises calculating y equal to* $rs^e$ *(mod n).*

*11. The prover device of claim 8, wherein the processor is configured to calculate y by calculating* $rs^e$ *(mod n).*

*12. The article of claim 9, wherein generating a result y comprises calculating y equal to* $rs^e$ *(mod n).*

* * * * *

UNITED STATES PATENT AND TRADEMARK OFFICE

CERTIFICATE OF CORRECTION

PATENT NO. : RE42,517 E
APPLICATION NO. : 12/393959
DATED : July 5, 2011
INVENTOR(S) : Girault et al.

It is certified that error appears in the above-identified patent and that said Letters Patent is hereby corrected as shown below:

Title page, item (56), under "Other Publications", in Column 2, Line 2, delete "PCT1FR00/00174." and insert -- PCT/FR00/00174. --.

Title page, item (56), under "Other Publications", in Column 2, Line 15, delete "Sones," and insert -- Sons, --.

Title page, item (56), under "Other Publications", in Column 2, Line 18, delete "Sones," and insert -- Sons, --.

Title page, item (56), under "Other Publications", in Column 2, Line 20, delete "Cyptology" and insert -- Cryptology --.

Title page, item (56), under "Other Publications", in Column 2, Line 23, delete "Cyptology" and insert -- Cryptology --.

Title page, under "Primary Examiner", in Column 2, Line 1, delete "Ninh Dinh" and insert -- Minh Dinh --.

Title page, item (57), under "Abstract", in Column 2, Line 4, delete "—" and insert -- v̲ --.

Title page, item (57), under "Abstract", in Column 2, Line 5, delete "—" and insert -- n̲ --.

Title page, item (57), under "Abstract", in Column 2, Line 6, delete "—" and insert -- t̲ --.

Title page, item (57), under "Abstract", in Column 2, Line 7, delete "—" and insert -- v̲ --.

Signed and Sealed this
Twenty-second Day of November, 2011

David J. Kappos

David J. Kappos
*Director of the United States Patent and Trademark Office*

Title page, item (57), under "Abstract", in Column 2, Line 11, delete "$\underline{n}$" and insert -- $\underline{n}$ --.

Title page, item (57), under "Abstract", in Column 2, Line 12, delete "$\underline{n}$" and insert -- $\underline{n}$ --.

Column 6, Line 36, in Claim 5, delete "v=s–t" and insert -- $v=s^{-t}$ --.

Column 6, Line 42, in Claim 6, delete "rt" and insert -- $r^{t}$ --.